Figure 1:
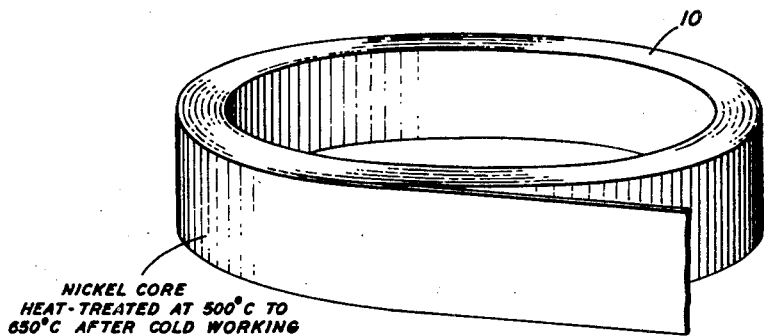

Aug. 22, 1950   E. A. NESBITT ET AL   2,519,495
MAGNETOSTRICTIVE CORES AND
METHOD OF MAKING THEM
Filed Jan. 11, 1947

INVENTORS E. A. NESBITT
H. J. WILLIAMS
BY Edwin B. Cave
ATTORNEY

Patented Aug. 22, 1950

2,519,495

UNITED STATES PATENT OFFICE 2,519,495

MAGNETOSTRICTIVE CORE AND METHOD OF MAKING IT

Ethan A. Nesbitt and Howell J. Williams, Chatham, N. J., assignors to Bell Telephone Laboratories, Incorporated, New York, N. Y., a corporation of New York Application January 11, 1947, Serial No. 721,612

8 Claims. (Cl. 175—21)

This invention relates to magnetostrictive devices and to methods of producing such devices.

In particular, this invention relates to manetostrictive devices in which the magnetostrictive element is made of a permanent magnet body of nickel which has been subjected to a special treatment comprising working and heating. Such a treatment gives a high coercive force to the nickel so that a magnetostrictive element made from it may be efficiently operated entirely on remanence without the aid of an external polarizing device.

In using magnetostrictive devices having magnetostrictive elements which vibrate mechanically under the influence of a magnetic winding supplied with alternating current, it has been found that the greatest degree of magnetostriction is obtained when the vibrating element is magnetically polarized. This polarization is necessary in order to bring the total flux density within the element to a point at which there will be no reversal of magnetic flux direction in the magnetostrictive device throughout the alternating current cycle, and at which the change in dimensions of the element will be substantially proportional to the change in flux density, so that the wave form of the mechanical vibrations of the magnetostriction element will conform as nearly as possible to the wave form of the alternating current applied to it.

Ordinarily the polarization of the magnetostriction element has been accomplished by means of an external direct current winding applied to the element, by means of a direct current superimposed upon the alternating current winding or by a permanent magnet placed in the vicinity of the element. The use of either the external winding, the superimposed direct current or the permanent magnet to polarize the element presented difficulties, for the external winding or the superimposed direct current required a source of power, while, if the external permanent magnet was used, the device did not operate in a closed magnetic circuit. Also the use of an external polarizing winding or of an enlarged alternating current winding to carry the extra biasing current, together with the required additional power supply, or the use of an external permanent magnet, took up extra space which was most unsatisfactory in equipment where available space was at a minimum.

In the device of the present invention the above-described difficulties are avoided by using, for the magnetostrictive element, nickel which has been subjected to a special treatment, which confers on it a sufficiently high coercive force so that the vibrating element may be operated entirely on remanence for most purposes without being demagnetized by the alternating current values required for these purposes. This does away with the necessity of using the external polarizing winding or magnet with a resulting saving in space and labor. Even for uses which require large values of alternating currents which would, in the absence of a biasing field, tend to demagnetize the magnetostrictive cores of the present invention, such cores are desirable since they reduce considerably the necessary size of supplementary biasing equipment.

Nickel is one of the metals most commonly used for forming magnetostrictive cores. It has always been used for this purpose in the magnetically soft state (obtained by annealing at 1000° C. or higher) in which it has the highest permeability and in which the greatest dimensional change is obtained with a given change in magnetizing current.

It was to be expected that operation entirely on remanence, requiring as it does magnetically harder nickel of lower permeability, could operate only at relatively low magnetostrictive efficiency. It was found, surprisingly, that mechanical working of nickel to harden it, followed by annealing within a narrow temperature range resulted in magnetostrictive cores which possessed a good efficiency (defined as the ratio of mechanical power output to electrical power input) and at the same time possessed an adequate coercive force for satisfactory operation without a biasing field, as will be described more in detail below.

According to the present invention vibrating magnetostrictive elements are made from nickel which has been cold worked and then annealed at from 500° C. to 650° C.

The initial cold working serves to insure that the nickel is sufficiently hard so that the subsequent annealing will be effective. Therefore obviously the cold working must be of sufficient extent to produce a hardness at least as great as that produced by annealing a completely hardened specimen at the annealing temperatures of the present invention. The material should therefore be cold worked, as by rolling, to a reduction in thickness of at least 10 per cent, but the cold working may be continued up to about 20 per cent or more reduction in thickness. There is no upper limit to the amount of cold working to which the nickel may be subjected prior to annealing other than the limitations of practical convenience.

The best results are obtained when the material is heated at approximately 600° C., but good results are also obtained when the material is heated from about 550° C. to about 625° C. or even in the range from 500° C. to 650° C. The time of heating is not critical, but it should be long enough to insure thorough heating throughout the body, such as about fifteen minutes, and it may continue for an hour or more or as long as convenience permits. The heating may be done in a sealed pot to prevent excessive oxidation, or it may be done in an atmosphere of hydrogen or nitrogen. The cooling rate after heat treatment is not important.

A piece of nickel which has been treated according to this process will when magnetized retain the magnetization even when subjected to forces which tend to demagnetize it, such as a properly limited alternating current field or ordinary mechanical shock.

Small amounts of vanadium, chromium, manganese, molybdenum, titanium, silicon or aluminum in amounts of the order of 5 per cent (or in some instances as much as 10 per cent) or less by weight may be added to the nickel prior to the cold rolling and heat treatment to increase the resistivity of the nickel and thus to reduce eddy current losses and increase the efficiency of the magnetostrictive device formed from the nickel.

Figure 2:
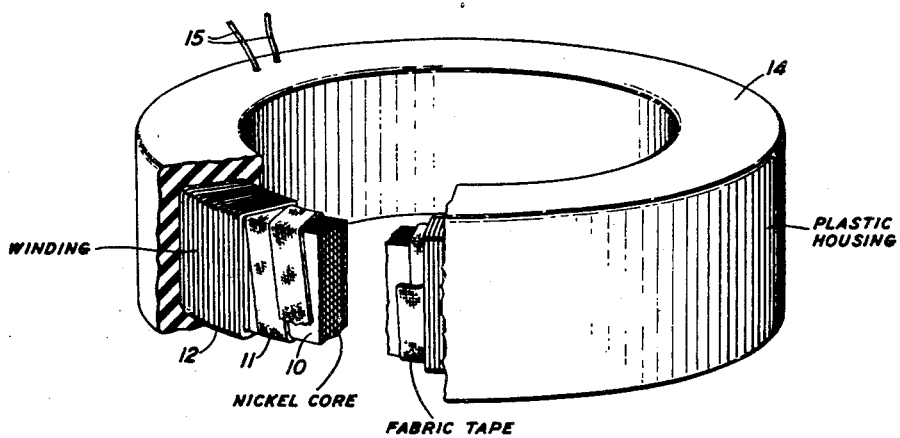
Figure 3:
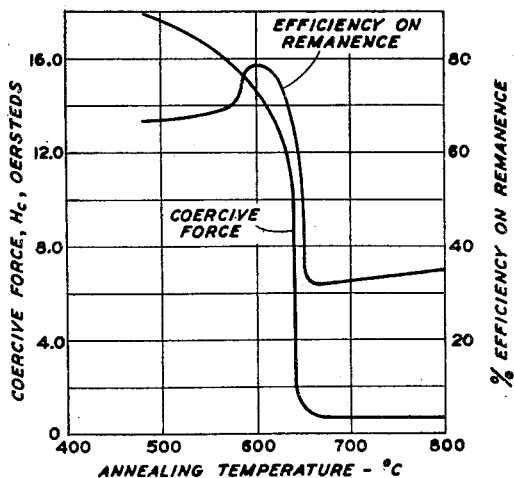

The invention can best be described as illustrated by one particular form of magnetostrictive device shown in the accompanying drawing in which:

Fig. 1 is a perspective view of one form in which the vibrating element of the present invention may be used;

Fig. 2 is a perspective view of a finished unit employing a vibrating element as shown in Fig. 1, portions of the unit being broken away to show the construction thereof; and Fig. 3 is a chart showing the variation, as the annealing temperature is varied, of coercive force and efficiency of the magnetostrictive device of Fig. 1 when the magnetizing winding is energized with alternating current without a direct current bias.

The beneficial effects obtained by the above-described treatment of nickel are shown clearly in the graph of Fig. 3 which shows the variation of the coercive force with the annealing temperature, and also the variation of the efficiency of the material operating on remanence with the annealing temperature. As may be seen the greatest efficiency is obtained when the material is annealed at about 600° C., while the coercive force tends to decrease as the annealing temperature is raised.

Materials treated in accordance with the present invention may be employed in the form of a spirally-wound tape core 10 as that shown in Fig. 1. In forming such a core 10 the material is first put through a series of cold rolling operations to form a tape. The last cold rolling operation should cause a reduction in thickness of at least 10 per cent in order to give sufficient hardness to the material so that the subsequent annealing operation will be effective. Ordinarily cores have the most efficient operation when they are formed of thin tapes such as tapes having a thickness of from 5 to 6 mils or even less, such as 1 mil or 2 mils. In determining the thickness to use for the tape practical considerations such as the matter of fabricating, handling, and winding thin tapes and the increased tendency of thinner tape cores to vibrate in parasitic modes, must be taken into account in the design of any particular magnetostrictive core. The tape may be insulated by coating it with an insulating material such as an insulating oxide like silica, either cataphoretically or by passing it through a suspension of silica in a volatile liquid. The tape may then be wound on a circular mandrel to form the spiral core 10 shown in Fig. 1. The core 10 is then annealed on the mandrel under the conditions heretofore described.

After annealing, the core 10 is removed from the mandrel and vacuum impregnated with a suitable material, such as a phenolic condensation product like Bakelite, to make the core rigid so that it will vibrate in a single mode with no parasitic modes of vibration and to further insulate the core. The core 10 may then be embodied in the unit shown in Fig. 2 which shows the spiral core 10 having a fabric tape covering 11 thereon, and a coil 12 wound over the covering 11 having leads 15. The combined structure of coil, impregnated core and covering are molded or cast in a plastic insulating body 14. The body 14 in which the core and coil are cast serves to reinforce the core against parasitic vibrations which may occur due to the vibration of the core 10 when signal currents are applied to the coils 12. Plastics, and particularly phenolic condensation products, are suitable for use as materials for the body. Such a method of enclosing the magnetostrictive element as described above is disclosed in the applications of E. E. Mott, Serial No. 549,970, filed August 8, 1944, now Patent No. 2,438,926, and Serial No. 617,001, filed September 18, 1945, now Patent No. 2,497,901.

Other convenient methods of impregnating or insulating the magnetostrictive element may of course be used.

When the magnetostrictive element has been impregnated, it may be subjected to a magnetizing force from an applied current or an external permanent magnet preferably sufficiently strong to magnetize it to at least its saturation point, or near thereto, so as to cause it to be permanently magnetized in one direction.

The nickel treated according to the process of the present invention may be used in the magnetostrictive element in the form of a toroidal spirally-wound tape core as described above, as well as in the form of a stacked laminated core made either from circular rings or rectangular plates, or in various suitable forms of other types.

The above-described magnetostrictive elements made from nickel treated according to the process of the present invention may be used in general as electromechanical transducers in any device in which it is desired to convert electrical current variations into corresponding mechanical variations or vice versa, or in which it is desired to use natural mechanical vibrational frequencies to control electrical frequencies, as in underwater sound projectors and microphones, frequency control devices, electromechanical filters, telephone receivers and other devices. In general, the magnetostrictive devices of the present invention may be used in place of piezoelectric crystals in any circuits or devices in which such crystals are used. Although specific embodiments of the invention have been shown and described, it will be understood that they are but illustrative and that various modifications may be made therein without departing from the scope and spirit of this invention.

What is claimed is:

1. A magnetostrictive core composed of a plurality of laminations of magnetostrictive material annealed at from 500° C. to 650° C. from a hardened condition resulting from cold working to a thickness reduction of at least 10 per cent, said material consisting of nickel containing up to 5 per cent of a resistance-increasing element selected from the group consisting of vanadium, chromium, manganese, molybdenum, titanium, silicon and aluminum.

2. A vibratile magnetostrictive core composed of a plurality of laminations of magnetostrictive material substantially no greater than 6 mils in thickness, said material consisting of nickel annealed at from 500° C. to 650° C. from a hardened condition resulting from cold working to a thickness reduction of at least 10 per cent.

3. An annular vibratile magnetostrictive core composed of a plurality of spirally wound turns of magnetostrictive tape having a thickness of the order of 2 mils, said tape consisting of nickel annealed at from 500° C. to 650° C. from a hardened condition resulting from cold working to a thickness reduction of at least 10 per cent.

4. A method of forming a vibratile magnetostrictive core comprising cold working, to a thickness reduction of at least 10 per cent, a body consisting of nickel containing up to 5 per cent of a resistance-increasing element selected from the group consisting of vanadium, chromium, manganese, molybdenum, titanium, silicon and aluminum to harden it, forming said body into a laminated core, and annealing said core at a temperature of from 500° C. to 650° C.

5. A method of forming an annular, radially vibratile magnetostrictive core comprising cold working, to a thickness reduction of at least 10 per cent, a body consisting of nickel containing up to 5 per cent of a resistance-increasing element selected from the group consisting of vanadium, chromium, manganese, molybdenum, titanium, silicon and aluminum to form it into a tape no greater than 6 mils in thickness, forming said tape into a spiral core, and annealing said core at a temperature of from 500° C. to 650° C.

6. A method of forming an annular, radially vibratile magnetostrictive core comprising cold working, to a thickness reduction of at least 10 per cent, a body consisting of nickel to form it into a tape no greater than 6 mils in thickness, forming said tape into a spiral core, applying insulating material to the surface of said tape, annealing said core at a temperature of from 500° C. to 650° C., embedding said core in an organic polymeric insulating material, and causing said core to be magnetized to at least its saturation point.

7. An annular vibratile magnetostrictive core composed of a plurality of spirally wound turns of magnetostrictive tape hardened by cold working to a thickness reduction of at least 10 per cent and then annealed at from 500° C. to 650° C., said tape consisting of nickel containing up to 5 per cent of a resistance-increasing element selected from the group consisting of vanadium, chromium, manganese, molybdenum, titanium, silicon and aluminum, said tape being no greater than 6 mils in thickness, said tape being coated with a layer of insulating material, said core being embedded in an organic polymeric insulating material.

8. A method as described in claim 5 wherein the annealing is carried out at a temperature of from 550° C. to 625° C.

ETHAN A. NESBITT.
HOWELL J. WILLIAMS.

REFERENCES CITED

The following references are of record in the file of this patent:

UNITED STATES PATENTS

| Number | Name | Date |
|---|---|---|
| 1,673,790 | Bandur | June 19, 1928 |
| 1,743,089 | Bandur | Jan. 14, 1930 |
| 1,924,245 | Koster | Aug. 29, 1933 |
| 1,941,368 | Smith | Dec. 26, 1933 |
| 2,164,383 | Burton | July 4, 1939 |
| 2,166,359 | Lakatos | July 18, 1939 |
| 2,234,968 | Hayes et al. | Mar. 18, 1941 |

OTHER REFERENCES

"The Journal of the Iron and Steel Institute," No. 1, 1930, vol. CXXI, published by the Institute, London, page 726.